United States Patent Office 3,520,201
Patented July 14, 1970

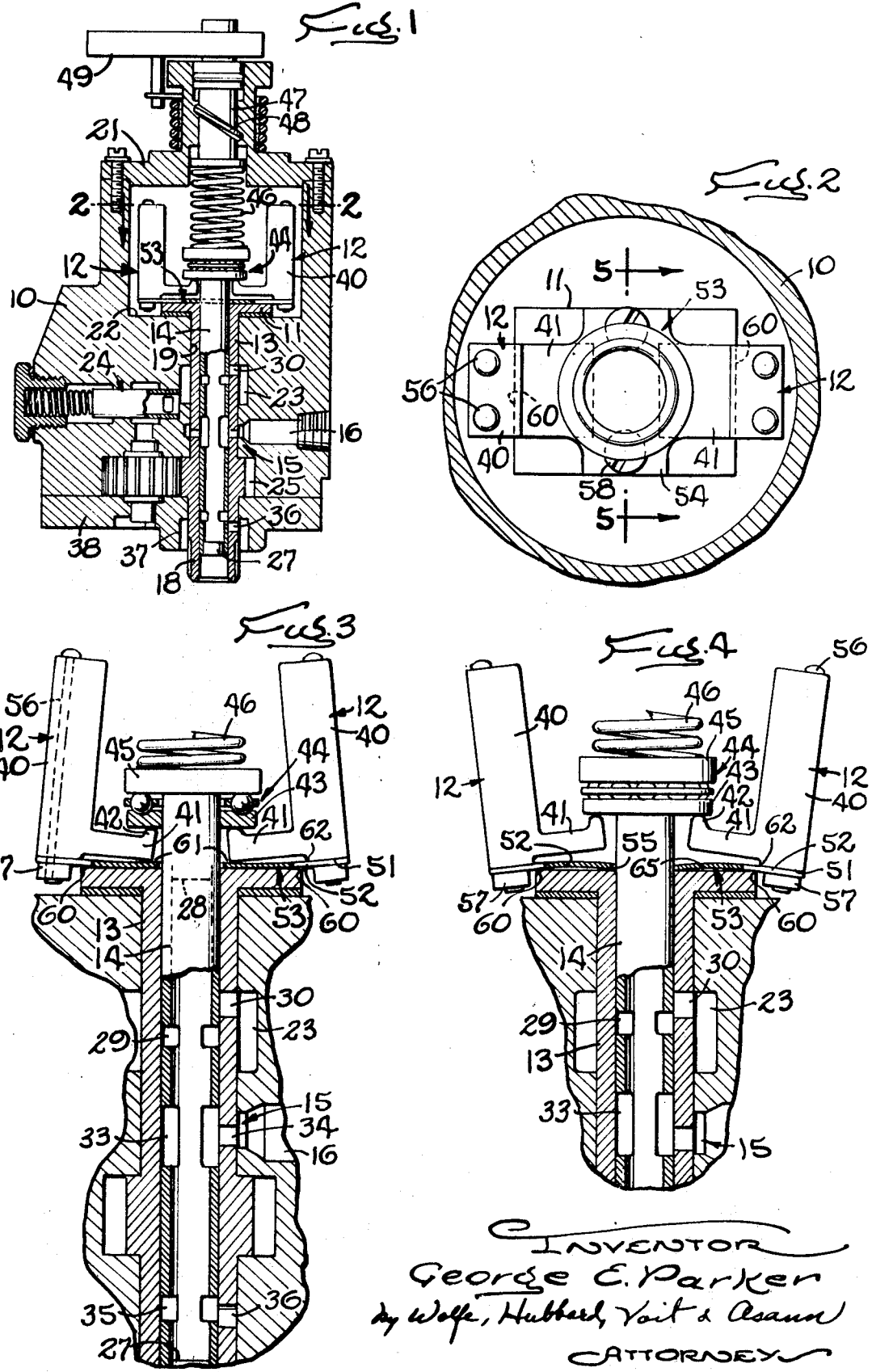

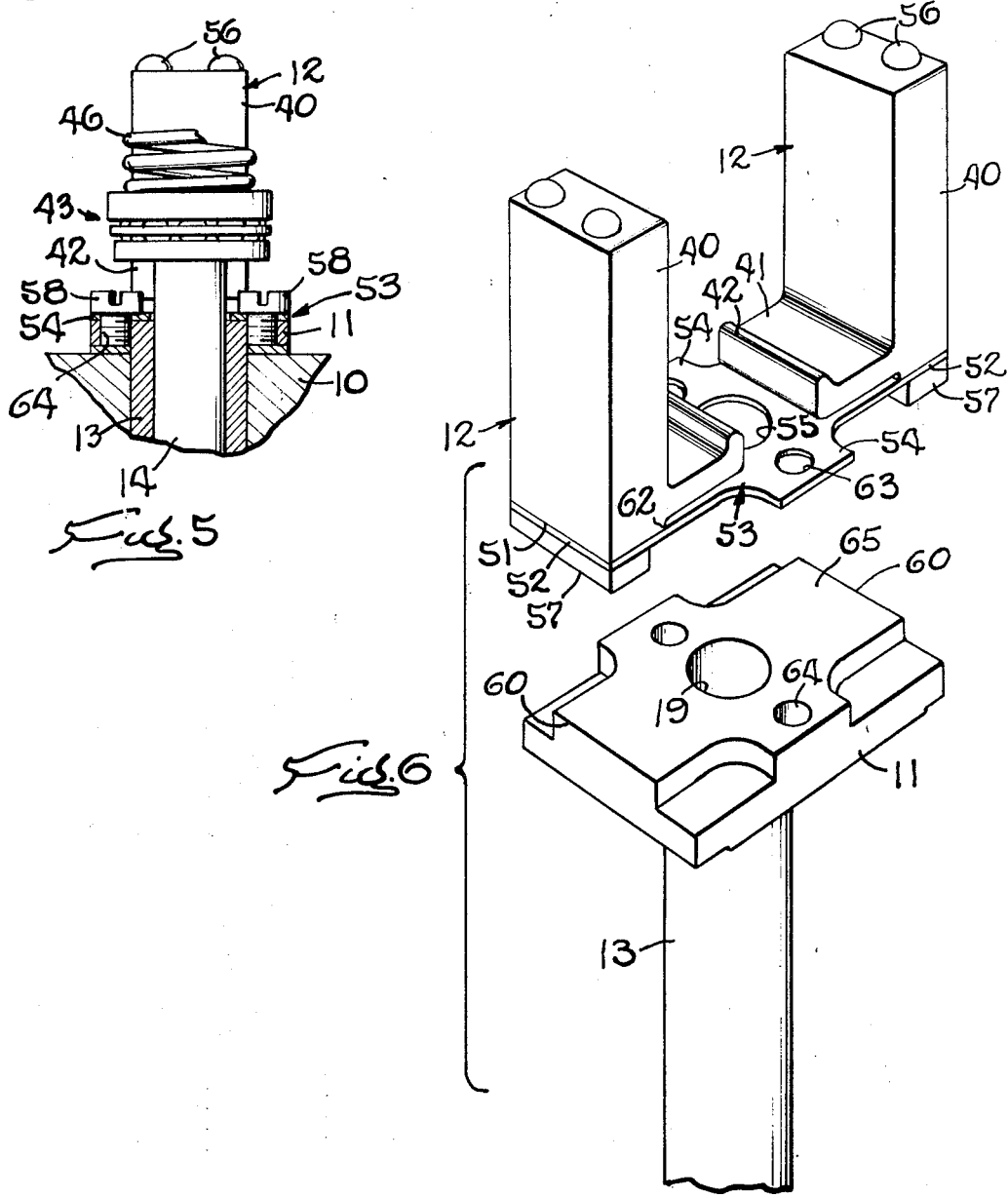

---

3,520,201
SPEED SENSOR WITH LEAF SPRING SUPPORTED FLYWEIGHTS
George E. Parker, Rockford, Ill., assignor to Woodward Governor Company, Rockford, Ill., a corporation of Illinois
Original application Jan. 12, 1968, Ser. No. 697,506, now Patent No. 3,469,397, dated Sept. 30, 1969. Divided and this application Feb. 12, 1968, Ser. No. 704,672
Int. Cl. G01p 3/20; G05d 13/14
U.S. Cl. 73—546                           5 Claims

ABSTRACT OF THE DISCLOSURE

Upstanding flyweights of a speed sensor are fixed to the outer ends of oppositely projecting arms of a flat leaf spring of cross-shape extending across the flat top of a rotary ball-head with the other arms of the cross secured to the ball-head. As the flyweights swing outwardly with a speed increase, the first arms bow upwardly between the center anchor and edges extending across the outer ends of these arms which define abutment type fulcrums spaced close to the flyweights and permitting further outward swinging of the flyweights as the speed increases.

CROSS REFERENCE TO RELATED APPLICATION

This application is a division of my pending application Ser. No. 697,506, filed Jan. 12, 1968, now Pat. No. 3,469,397.

BACKGROUND OF THE INVENTION

This invention relates to speed sensors having flyweights upstanding from and supported by a rotary ball-head through the medium of an elongated leaf spring which defines fulcrums for outward swinging the the flyweights against the force of a speeder spring thus avoiding the use of pivots subject to rubbing friction.

SUMMARY OF THE INVENTION

The object of the present invention is to provide a flyweight mounting of the above character which as compared to prior mountings, is simpler in construction and adapted for operation at higher speeds, for example, 18,000 r.p.m., than has been possible to use heretofore in the speed governors of prime movers. This is accomplished by securing an elongated and readily flexible member, such as a leaf spring at its center to the top and at the center of a rotary ball-head and fixing the flyweights to the outer ends of the member close to and outwardly beyond parallel edges formed at opposite ends of the ball-head and constituting abutment type fulcrums about which the flyweights may swing outwardly by upward bowing of the opposite end portions or arms of the member between such fulcrums and their points of center anchorage. The flyweight fulcrums are free of rubbing friction and permit accurate speed sensing at very high ball-head speeds.

BRIEF DESCRIPTION OF THE DRAWINGS

FIG. 1 is a longitudinal diametrical sectional view of a prime mover speed governor having a speed senor embodying the novel features of the present invention.
FIG. 2 is a fragmentary section taken along the line 2—2 of FIG. 1.
FIGS. 3 and 4 are fragmentary enlargements of portions of FIG. 1 showing different positions of the parts.
FIG. 5 is a fragmentary section taken along the line 5—5 of FIG. 2.
FIG. 6 is an exploded perspective view of the mounting for the flyweights of the speed sensor.

DESCRIPTION OF THE PREFERRED EMBODIMENT

For purposes of illustration, the invention is shown in the drawings incorporated in a prime mover speed governor of the hydraulic type comprising generally a hollow casing 10 housing a ball-head 11 carrying flyweights 12 and fixed to the upper end of a drive sleeve 13 which cooperates with a plunger 14 actuated by the flyweights to define a valve indicated generally at 15. The latter controls the flow of fluid such as oil into and out of a space 16 communicating through piping (not shown) with the speed regulating servo.

The casing is usually mounted on the prime mover whose shaft is extended and coupled to the exposed lower end 18 of the sleeve 13. The latter projects through a bore 19 and into the ball-head cavity which is closed by a cover 21 and has a bottom surface 22 by which the sleeve and ball-head are supported. Intermediate the ends of the bore 19 is an annular groove 23 to which oil under high pressure determined by a spring loaded regulating valve 24 is delivered from the outlet (not shown) of a pump including a gear 25 fast on the sleeve 13.

In the present instance, the valve plunger 14 is a tube journaled within the sleeve 13 and slidable axially thereof, the lower end of the tube being closed by a plug 27 while the upper end is closed at 28 and extends above the upper end of the sleeve and through the ball-head 11. Arcuate holes 29 in the tube, when in register with arcuate ports 30 in the sleeve admit pressure fluid from the groove 23 into the tube, such fluid flowing out through axially elongated holes 33 in the tube which are in continuous registry with holes 34 in the sleeve 13 continuosuly communicating with the space 16 leading to the speed regulating servo. Holes 35 near the lower ends of the tube cooperate with ports 36 in the sleeve to close the tube or permit fluid to escape therefrom into a drain cavity 37 in the bottom plate 38 of the governor casing. In the centered or on-speed position of the value tube, the ports 30 and 36 are both covered as shown in FIG. 1 thus preventing the flow of fluid to or from the servo whose position is thus maintained fixed.

The flyweights 12 are of conventional construction each comprising a rectangular and upstanding bar 40 of metal integral at its lower end with a toe 41 projecting inwardly and at right angles and having a lug 42 which bears upwardly adjacent the governor axis against the lower race ring 43 of an anti-friction bearing 44. The upper race 45 of the latter is a flange integral with the upper end of the valve sleeve and forming an abutment for the lower end of a speeder spring 46 which abuts at its upper end against the end of a screw 47. The latter is threaded at 48 into a tubular extension of the casing cover 21 and is adjustable angularly by turning an arm 49 projecting outwardly from the upper end of the screw. By swinging the arm back and forth, the stressing of the spring 46 may be varied and the speed setting of the governor adjusted correspondingly.

To achieve the objectives of the present invention as summarized above, the flat lower ends 51 of the flyweight bars 40 are clamped securely against the outer ends of arms 52 comprising the outer end portions of an elongated flexible member 53 which extends diametrically across the top of the ball-head and is anchored at its center to the ball-head. Preferably, the member is a substantially right angular cross stamped out of thin sheet metal such as spring steel about .013 of an inch thick, the arms being about as wide as the flyweights. Shorter arms 54 of the cross project laterally from a center hole 55 through which the valve sleeve 14 projects upwardly to the bearing 43. The outer ends of the arms 52 are clamped securely against the lower ends 51 of the flyweight bars 40, this being accomplished herein by rivets 56 extending downwardly through the arms and the cross bars 57 below the arms. Screws 58 extend through holes 61 in the outer ends of the shorter arms 54 and thread into holes 64 in the ball-head to clamp the arms against the top of the ball-head and anchor the center of the cross thereto.

The longer arms 52 project radially in opposite directions from the hole 55, beneath and along the flyweight toes 41 and along the top 65 of the ball-head past opposite parallel ends 60 thereof. The latter are spaced equidistant from the ball-head axis and adapted for abutting engagement with the arms thus forming fulcrums about which the flyweights may swing in response to changes in the ball-head speed, such swinging involving only flexing of the arms 52. When the arms are engaging the fulcrums as shown in FIGS. 1 and 4, the flexing is permitted and accompanied by upward bowing of the portion of the arms between the center anchor and the fulcrums 60 as shown in FIG. 4.

The fulcrum lines 60 are disposed close to and preferably no more than .030 of an inch from the inner edges 62 of the bottoms 51 of the flyweight bars 40. The flyweights thus overhang the fulcrums 60 such a short distance that virtually the entire weight of the flyweights is sustained by the rigid ball-head and this, by resting of the arms on the ball-head at the fulcrum lines. As a result, the arms may be relatively thin and very flexible and are free for upward bowing between the fulcrums 60 and the center anchor, thus providing for movements of the flyweights rapidly in response to changes in the ball-head speed. The mounting provided is thus adapted for operation at speed far above that permissible in conventional flyweight governors while at the same time providing for rapid and accurate speed response and durability for long periods of service use.

In the governor above described, the speeder spring 46 is usually adjusted for low speed operation with the flyweights canted inwardly and the toes 41 swung downwardly and holding the inner end portions of the spring arms 52 against the top of the ball-head as shown in FIG. 3. The remaining and outer end portions of the arms then bow upwardly and are disposed above the fulcrum lines 60. As the speed of the ball-head increases, the arms fulcrum on the ball-head at 61 about their inner ends and come flat against the top of the ball-head as shown in FIG. 1 and as the speed increases. Then, as the speed increases further, the fulcrums of the arms shift and are transferred outwardly to the lines 60 as the intervening lengths of the arms bow upwardly (FIG. 4) and the bottoms of the flyweight bars move below these fulcrums. As the speed increases and decreases, the flyweight changes freely and is accompanied by corresponding upward and downward bowing of the arms 52.

I claim:

1. A speed sensor having, in combination: a rotatable ball-head having a substantially flat end, an elongated and substantially straight flexible member composed of resilient material and extending transaxially across said ball-head end, means anchoring the center of said member to said ball-head to provide two flexible arms radiating outwardly in opposite directions from such anchorage along said ball-head end and beyond rigid edges on diametrically opposite sides of the end, flyweights upstanding from and secured to the outer ends of said arms beyond said edges and having toes extending inwardly and partially across said ball-head end and overlying the outer end portions of the arms, said edges extending transversely of said arms adjacent but short of the points of attachment to said flyweights and providing radially fixed fulcrums for outward swinging of said flyweights by bowing of the arms away from the ball-head end between such edges and the center anchorage of the arms as the speed of the ball-head increases beyond a speed at which the arms lie alongside said ball-head end, and a speeder spring exerting a force on the inner ends of said toes to balance the centrifugal force developed by said flyweights during rotation of said ball-head.

2. The combination as defined in claim 1 in which said arms are on an integral and substantially flat cross-shaped sheet having transversely extending projections at the center thereof anchored at their outer ends to said ball-head end.

3. The combination as defined in claim 2 in which said member is formed between said anchored projections with a central aperture and including a control element extending through said aperture and movable axially of said ball-head and back and forth with changes in the positions of said flyweights as transmitted through said toes.

4. The combination as defined in claim 2 in which said flyweights overhang said fulcrums distances which are a small fraction of the lengths of said arms.

5. The combination as defined in claim 4 in which said overhang is on the order of .03 of an inch.

References Cited

UNITED STATES PATENTS

| | | | |
|---|---|---|---|
| 458,045 | 8/1891 | Dales | 73—550 XR |
| 967,168 | 8/1910 | Bullard | 73—546 XR |
| 1,709,463 | 4/1929 | Crafts | 73—546 XR |
| 2,615,704 | 10/1952 | Vacha | 73—537 |
| 2,645,237 | 7/1953 | Wheeler | 73—546 XR |

FOREIGN PATENTS 285,309   2/1928   Great Britain.

JAMES J. GILL, Primary Examiner

U.S. Cl. X.R.

137—53